(12) United States Patent
Manabe

(10) Patent No.: US 8,476,856 B2
(45) Date of Patent: Jul. 2, 2013

(54) THREE-PHASE AC MOTOR DRIVE CONTROL DEVICE

(75) Inventor: Shizuo Manabe, Toyota (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 0 days.

(21) Appl. No.: 13/395,720

(22) PCT Filed: Sep. 15, 2010

(86) PCT No.: PCT/JP2010/065987
§ 371 (c)(1),
(2), (4) Date: Mar. 13, 2012

(87) PCT Pub. No.: WO2011/034109
PCT Pub. Date: Mar. 24, 2011

(65) Prior Publication Data
US 2012/0176071 A1    Jul. 12, 2012

(30) Foreign Application Priority Data
Sep. 18, 2009   (JP) .................................. 2009-217743

(51) Int. Cl.
*H02P 7/00*   (2006.01)

(52) U.S. Cl.
USPC ............................ 318/432; 318/434; 318/437

(58) Field of Classification Search
USPC .............. 318/432, 254.1, 430, 434, 437, 632, 318/400.2, 800, 809, 811
See application file for complete search history.

(56) References Cited

U.S. PATENT DOCUMENTS

| | | | |
|---|---|---|---|
| 5,739,650 A * | 4/1998 | Kimura et al. | 318/400.07 |
| 6,400,116 B1 * | 6/2002 | Chen et al. | 318/599 |
| 6,781,333 B2 * | 8/2004 | Koide et al. | 318/432 |
| 2004/0104704 A1 * | 6/2004 | Hirono | 318/722 |
| 2008/0018274 A1 * | 1/2008 | Mori et al. | 318/268 |

FOREIGN PATENT DOCUMENTS

| | | |
|---|---|---|
| JP | 3533091 B2 | 3/2004 |
| JP | 2004-347612 A | 12/2004 |
| JP | 2005-218299 A | 8/2005 |
| JP | 2008-228431 A | 9/2008 |
| JP | 2010-124566 A | 6/2010 |
| JP | 2010-130809 A | 6/2010 |

OTHER PUBLICATIONS

Translation of International Preliminary Report on Patentability of PCT/JP2010/065987.
International Search Report and Written Opinion of PCT/JP2010/065987 mailed Dec. 28, 2010.

* cited by examiner

*Primary Examiner* — Bentsu Ro
*Assistant Examiner* — Iftekhar Mustafa
(74) *Attorney, Agent, or Firm* — Kenyon & Kenyon LLP

(57) ABSTRACT

A three-phase AC motor drive control device has a phase command calculation unit. When driving a three-phase AC motor by a three-phase alternating square-wave voltage that is converted in power according to a switching command corresponding to one cycle of the electrical angle obtained from a rotational position of the rotor of the three-phase AC motor, the phase command calculation unit performs a torque feedback calculation based on a torque deviation, obtains, based on this calculation result, a phase command that is the lead or lag angle amount of a phase to be corrected, and stores and updates this obtained phase command. To generate the switching command, the three-phase AC motor drive control device outputs a pulse pattern to an inverter, the pulse pattern being shifted in phase by the amount of the phase command with respect to the basic phase of the three-phase alternating square-wave voltage uniquely determined with respect to the one cycle of the electrical angle.

6 Claims, 7 Drawing Sheets

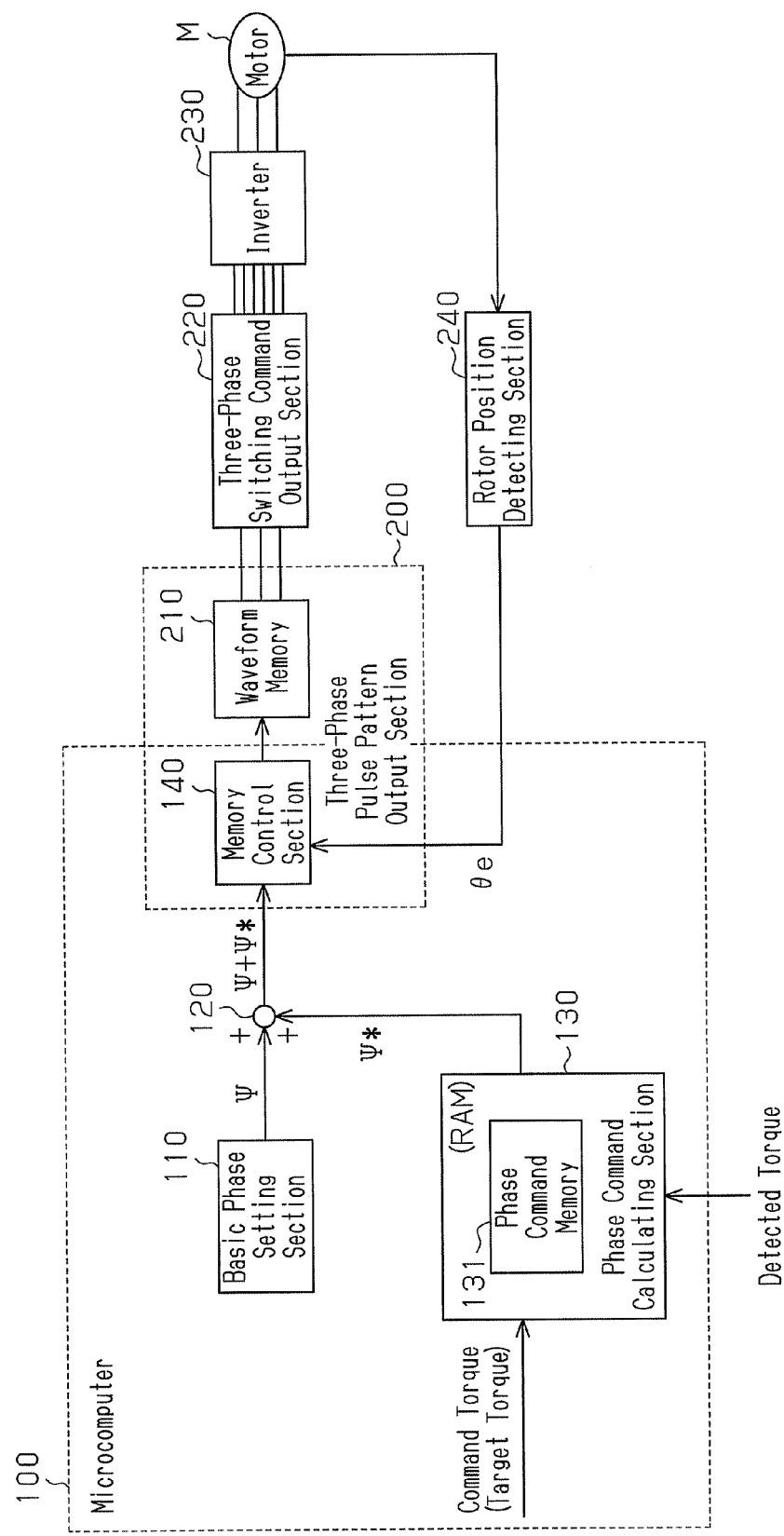

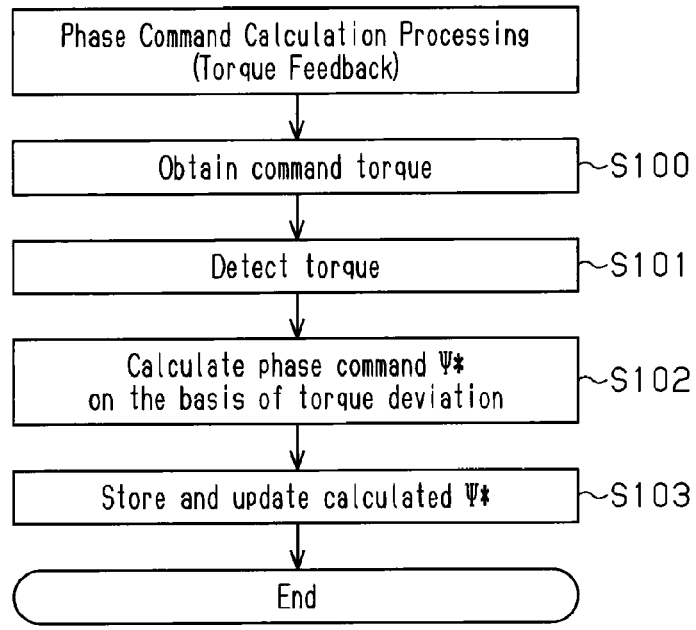
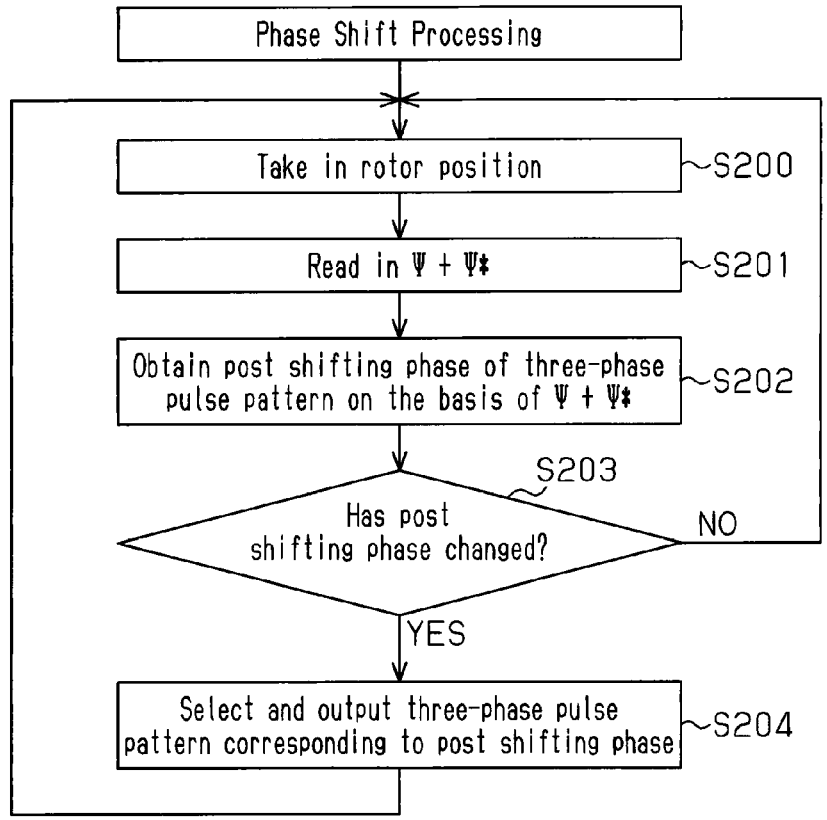

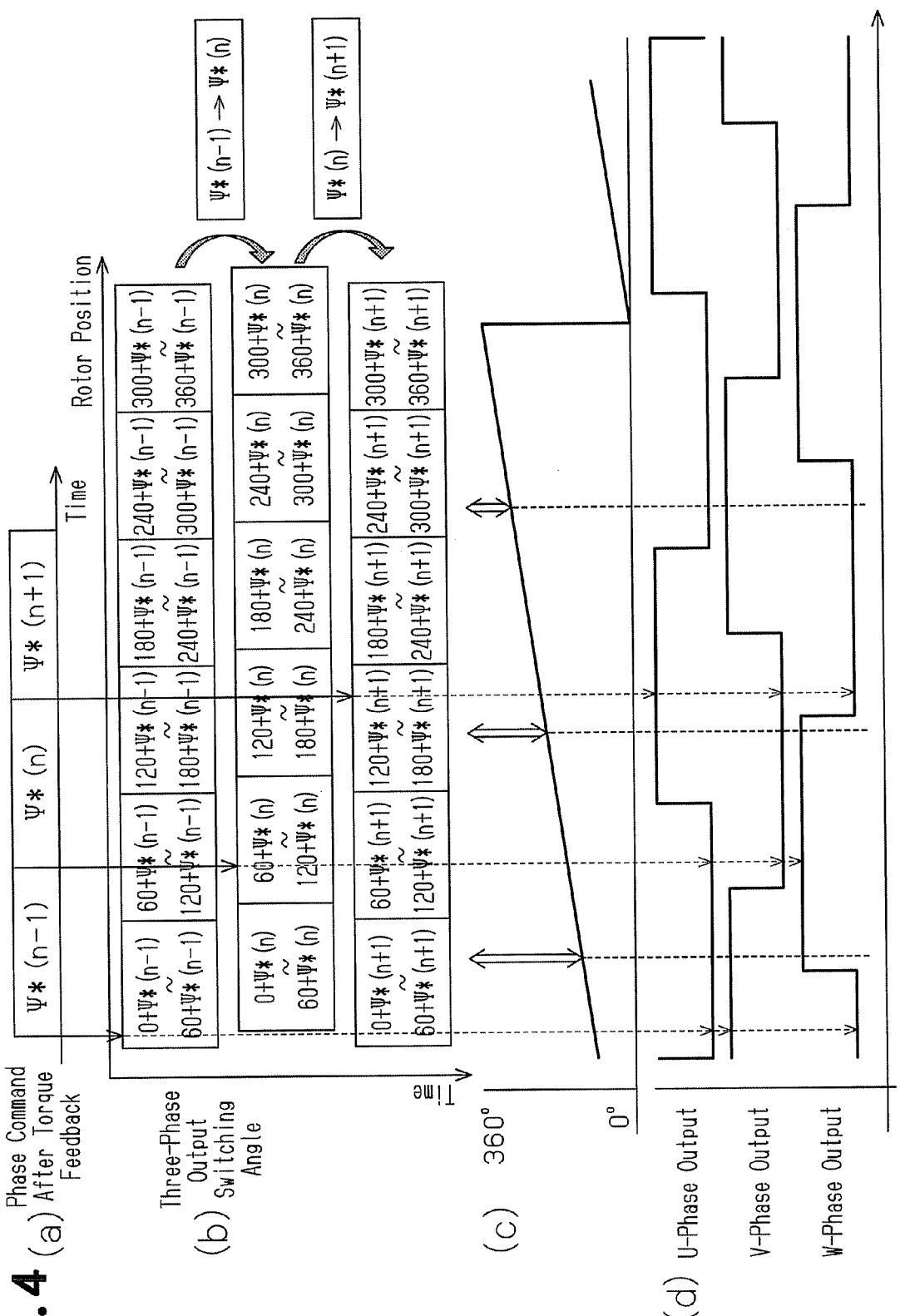

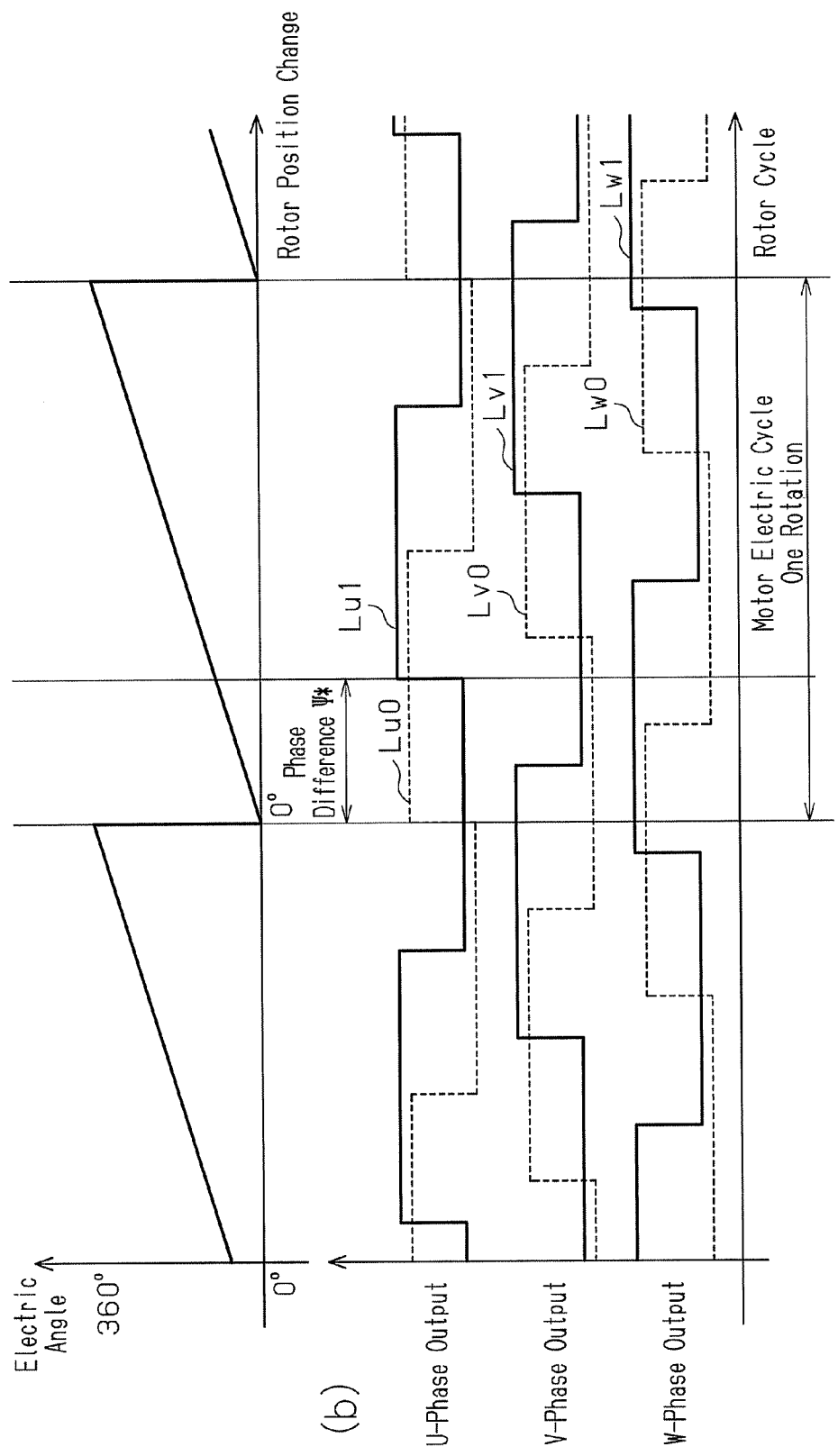

THREE-PHASE AC MOTOR DRIVE CONTROL DEVICE

This is a 371 national phase application of PCT/JP2010/065987 filed 15 Sep. 2010, which claims priority to Japanese Patent Application No. 2009-217743 filed 18 Sep. 2009, the contents of which are incorporated herein by reference.

FIELD OF THE INVENTION

The present invention relates to a three-phase AC motor drive control device, and particularly to a three-phase AC motor drive control device that drives and controls a three-phase AC motor by rectangular-wave voltage phase control.

BACKGROUND OF THE INVENTION

FIG. 7 illustrates an outline of a three-phase AC motor drive control device described in Patent Document 1.

This drive control device is mounted on a hybrid automobile or the like, for example. This drive control device controls driving of an inverter by switching a control mode among three control modes, that is, a PWM (pulse width modulation) current control mode and a PWM voltage phase control mode for driving the three-phase AC motor with high efficiency and a rectangular wave voltage phase control mode for improving a three-phase AC motor output.

The PWM current control mode is a control mode when switches 26 and 28 are both switched to the upper side in FIG. 7. In this PWM current control mode, voltage amplitude $|V|$ and a voltage phase $\Psi$ are set such that the current value supplied to the three-phase AC motor 38 and the command current value match each other. An alternating pulse voltage is generated in accordance with the voltage amplitude $|V|$ and the voltage phase $\Psi$, and the alternating pulse voltage is applied to the three-phase AC motor 38.

In the PWM voltage phase control mode, the voltage phase $\Psi$ is set in accordance with temporal changes of the voltage amplitude $|V|$. An alternating pulse voltage is generated in accordance with the set voltage phase $\Psi$, and the alternating pulse voltage is applied to the three-phase AC motor 38 by switching the switch 26 to the lower side and the switch 28 to the upper side in FIG. 7.

In the rectangular wave voltage phase control mode, the voltage amplitude $|V|$ is determined by a DC battery voltage Vdc, and the voltage phase $\Psi$ is set in accordance with a command torque value. A rectangular wave voltage is generated on the basis of the set voltage amplitude $|V|$ and voltage phase $\Psi$, and the rectangular wave voltage is applied to the three-phase AC motor 38 by switching the switch 28 to the lower side in FIG. 7.

Moreover, in the drive control device, a command torque value generated in accordance with an accelerator pedal manipulation amount and a brake pedal depression amount in a vehicle control device (not shown) is input into a current command generating section 12 and an adder 13. The current command generating section 12 generates command current values Iq and Id on the basis of the input command torque value and outputs the generated command current values Iq and Id to a current controller 14. The current controller 14 executes proportional-integral control on the basis of the input command current values Iq and Id and a current value detected by a current sensor 40 to generate the voltage amplitude $|V|$ and the voltage phase $\Psi$, which will be used as voltage command values. The switch 26 selectively switches whether or not to input the voltage amplitude $|V|$ and the voltage phase $\Psi$ generated by the current controller 14 into a PWM circuit 30. If the voltage amplitude $|V|$ and the voltage phase $\Psi$ are input, the PWM circuit 30 generates a sine wave on the basis of the voltage amplitude $|V|$ and the voltage phase $\Psi$. Moreover, the PWM circuit 30 generates a switching command on the basis of comparison between the sine wave and a triangular wave set in advance and outputs the switching command to an inverter 36 through the switch 28. The inverter 36 generates an alternating pulse voltage in accordance with the switching command output from the PWM circuit 30 and applies the alternating pulse voltage to the three-phase AC motor 38 as a driving voltage.

The current sensor 40 detects a current flowing through the three-phase AC motor 38 by application of the driving voltage and outputs the detected current value to an adder 24. The adder 24 receives the current value detected by the current sensor 40 and the command current value generated by the current command generating section 12. The adder 24 generates a difference between the input command current value and the detected current value, that is, a current deviation $\Delta I$ and outputs the current deviation $\Delta I$ to a current matching determining section 22. The current matching determining section 22 switches the switch 26 if the detected current value matches the command current value.

On the other hand, a torque value detected by torque detecting means 20 each time together with the command torque value is input into the adder 13. The adder 13 generates a difference between the torque values, that is, a torque deviation $\Delta T$ and supplies the generated torque deviation $\Delta T$ to a voltage phase controller 18. The voltage phase controller 18 generates the voltage phase $\Psi$ in accordance with the torque deviation $\Delta T$. The voltage phase controller 18 generates a rectangular wave voltage phase $\Psi$ in the rectangular wave voltage phase control mode and generates the voltage phase $\Psi$ of an alternating pulse voltage in the PWM voltage phase control mode.

Moreover, a voltage amplitude controller 16 supplies the voltage amplitude $|V|$ also to a voltage amplitude determining section 34. The voltage amplitude determining section 34 compares the supplied voltage amplitude $|V|$ with voltage amplitude corresponding to the rectangular wave voltage and switches the switch 28 on the basis of the comparison result.

A rectangular wave generating section 32 generates a rectangular wave voltage, which will be used as a switching command to the inverter 36, on the basis of the voltage phase $\Psi$ input from the voltage phase controller 18. When such a switching command is transmitted to the inverter 36 through the switch 28, the inverter 36 applies a switched alternating (AC) voltage to the three-phase AC motor 38 on the basis of the rectangular wave voltage. As a result, the three-phase AC motor 38 is driven.

As described above, the drive control device appropriately controls driving of the three-phase AC motor 38 in accordance with the traveling environment of the automobile by selectively switching the control mode among the PWM current control mode, the PWM voltage phase control mode, and the rectangular voltage phase control mode.

The rectangular wave voltage phase control mode is usually used in a high rotation range of the three-phase AC motor 38. Therefore, its control calculation needs to be completed in short time in order to ensure control responsiveness in the rectangular wave voltage phase control mode. Conventionally, the calculation has been performed through the following processing.

That is, in the rectangular wave voltage phase control mode, the rectangular wave voltage (switched alternating (AC) voltage), which is an output in the U-phase, the V-phase, and the W-phase, of the inverter 36 is successively switched by a 180° cycle in each phase in a mode synchronized with a rotor position (rotor angle) of the three-phase AC motor 38, as illustrated in FIG. 8.

In such switching control, first, a current flowing through the three-phase AC motor 38 is detected at an intermediate point of time t3 between a point of time t1 when an output in the V-phase is off and a point of time t2 when an output in the U-phase is on, that is, when the rotor position of the three-phase AC motor 38 reaches an angle θ1. Subsequently, the voltage phase Ψ according to the torque deviation ΔT at that time is calculated through a torque feedback calculation on the basis of the detected current. An output switching angle in each next phase is determined on the basis of the voltage phase Ψ calculated as above, and next interruption setting is performed by the determined output switching angle so that the drive control of the three-phase AC motor 38 is executed. As described above, the switching command for generating the three-phase output is calculated during the period in which the rotor angular position changes from an interruption angle θ1 to an interruption end angle θ2 (approximately 30°) as illustrated as a period t3-t2 in FIG. 8.

Such calculation of the switching command usually takes time of 70 μsec. However, if the three-phase output is switched in the mode synchronized with the rotor position as described above, time corresponding to the time between each interruption angle, that is, time allowed for calculation of the switching command for the next one cycle becomes shorter as the rotation speed of the three-phase AC motor 38 is raised. If the rotation number of the four-pole-pair three-phase AC motor is 20,000 rpm, for example, time corresponding to the time between the interruption angles (t3-t2) becomes 60 μsec or less, which is shorter than the time usually required for the calculation of the switching command. As a result, the calculation is not completed in the time (t3-t2), the next rectangular wave cannot be generated, and a switching element does not operate for one cycle. Thus, if the calculation of the switching command is not completed in each time corresponding to the time between the interruption angles in the rectangular wave voltage phase control, the rectangular wave voltage is lost, which might incur loss of synchronism of the three-phase AC motor, for example, and the drive control device can no longer execute appropriate inverter control.

PRIOR ART DOCUMENT

Patent Document

Patent Document 1: Japanese Patent No. 3533091

SUMMARY OF THE INVENTION

An objective of the present invention is to provide a three-phase AC motor drive control device capable of rectangular wave voltage control with high reliability even in a high-speed rotation range of the three-phase AC motor.

To achieve the foregoing objective and in accordance with one aspect of the present invention, a three-phase AC motor drive control device is provided. When driving a three-phase AC motor by a three-phase alternating rectangular wave voltage that has been power-converted on the basis of a switching command set in accordance with one cycle of an electric angle acquired from a rotational position of a rotor of the three-phase AC motor, the control device feedback-controls the voltage phase of the three-phase alternating rectangular wave voltage on the basis of a torque deviation between a command torque value to the three-phase AC motor and an actual torque value of the three-phase AC motor. The control device includes a phase command calculating section and a pulse pattern output section. The phase command calculating section executes torque feedback calculation on the basis of the torque deviation, acquires a phase command, which is an advanced angle amount/delayed angle amount of a phase to be corrected on the basis of the calculation result, and successively stores and updates the acquired phase command. In order to generate the switching command, the pulse pattern output section always outputs a pulse pattern that is obtained by phase-shifting, only by the amount corresponding to the phase command, a basic phase of the three-phase alternating rectangular wave voltage, the basic phase being uniquely determined for one cycle of the electric angle, while monitoring the rotational position.

BRIEF DESCRIPTION OF THE DRAWINGS

FIG. 1 is a block diagram illustrating a three-phase AC motor drive control device according to one embodiment of the present invention;

FIG. 2 is a flowchart illustrating a processing procedure of phase command calculation by the device in FIG. 1, FIG. 3 is a flowchart illustrating a processing procedure of phase shift by the device in FIG. 1;

FIG. 4 is a timing chart illustrating an example of changes of (a) a phase command Ψ*, which is stored in a phase command memory and updated, (b) a relationship between a post shifting phase Ψ+Ψ* successively updated in accordance with the phase command and a switching angle of a three-phase alternating rectangular wave voltage; (c) an electric angle corresponding to a rotational position of a rotor of a three-phase AC motor; and (d) pulse patterns for the three phases in which the post shifting phase Ψ+Ψ* is reflected;

FIG. 5 is a timing chart illustrating an example of changes of (a) an electric angle corresponding to a rotor position of the three-phase AC motor, and (b) a three-phase pulse pattern as a reference and a three-phase pulse pattern after phase-shift in accordance with the phase command;

DETAILED DESCRIPTION OF THE PREFERRED EMBODIMENTS

Figure 6:
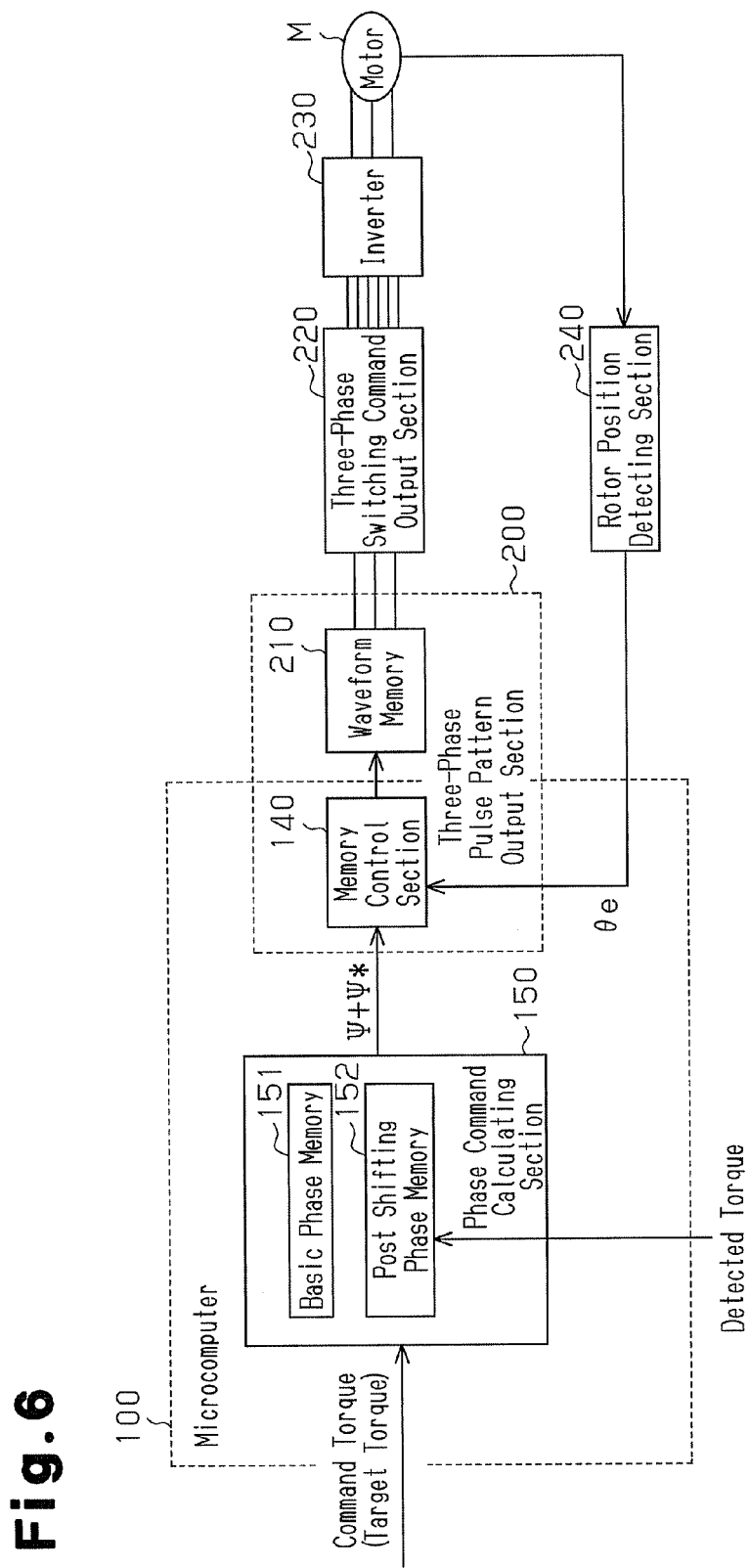
FIG. 6 is a block diagram illustrating a drive control device of a three-phase AC motor according to a modification of the present invention.

One embodiment of the present invention will be described below. A three-phase AC motor drive control device in this embodiment drives and controls a three-phase AC motor that is mounted on a hybrid automobile or the like and is used as a drive power source thereof, for example, similarly to the drive control device in FIG. 7. FIG. 1 illustrates the three-phase AC motor drive control device according to the embodiment of the present invention.

As illustrated in FIG. 1, the drive control device of the three-phase AC motor is provided with a microcomputer 100, which controls driving of a three-phase AC motor M. The microcomputer 100 has a basic phase setting section 110, which sets a basic phase Ψ of an alternating rectangular wave voltage in three phases. The basic phase Ψ is uniquely determined to one cycle of an electric angle in accordance with a specification of the three-phase AC motor M. The basic phase $\Psi$ set in the basic phase setting section 110 is input into an adder 120.

A phase command calculating section 130 provided in the microcomputer 100 receives a command torque value generated in accordance with an accelerator pedal manipulation amount and a brake pedal depression amount in a vehicle control device (not shown) and an actual torque value of the three-phase AC motor M detected by a torque sensor or the like. In the phase command calculating section 130, torque feedback calculation on the basis of the deviation between the command torque value and the actual torque value input each time is executed, and a phase command $\Psi^*$, which is an advanced angle amount/delayed angle amount of the phase to be corrected, is acquired on the basis of the calculation result. The acquired phase command $\Psi^*$ is successively stored in a phase command memory 131 and updated, and the stored or updated value is successively read out to the adder 120. The adder 120 calculates a phase after being shifted by the phase command $\Psi^*$ with respect to the basic phase $\Psi$, that is, a post shifting phase $\Psi+\Psi^*$, through addition processing of the input basic phase $\Psi$ and the phase command $\Psi^*$.

The post shifting phase $\Psi+\Psi^*$ as above is input into a three-phase pulse pattern output section 200. The three-phase pulse pattern output section 200 outputs a pulse pattern phase-shifted only by the phase command $\Psi^*$ with respect to the basic phase $\Psi$ in order to generate a switching command. The three-phase pulse pattern output section 200 includes a memory control section 140 into which the post shifting phase $\Psi+\Psi^*$ is input in the microcomputer 100 and a waveform memory 210 (a nonvolatile memory, for example), which outputs a pulse pattern in accordance with an access by the memory control section 140. The memory control section 140 reads the post shifting phase $\Psi+\Psi^*$ all the time from the phase command memory 131 (or more accurately, the adder 120) and makes an access to the waveform memory 210 while monitoring a rotational position (electric angle) $\theta e$ of the rotor of the three-phase AC motor M on the basis of an output of a rotor position detecting section 240 composed of a resolver and the like, for example. The ratio between the number of pairs of poles of the three-phase AC motor M and a multiplication factor for the angle of the resolver is 1:1 in this embodiment. The waveform memory 210 stores pulse waveform groups for the three phases deriving from a fixed pulse pattern corresponding to the basic phase $\Psi$, respectively, in the number according to resolution of the phase command $\Psi^*$ (that is, the advanced angle amount/delayed angle amount with respect to the basic phase $\Psi$) and the maximum advanced angle amount/delayed angle amount with respect to the basic phase $\Psi$. That is, all the groups of pulse waveforms for three phases that can be generated by the phase shift according to the phase command $\Psi^*$ are stored in the waveform memory 210. The memory control section 140 reads the post shifting phase $\Psi+\Psi^*$ all the time and makes an access to the waveform memory 210 in order to select a pulse waveform group for the three phases corresponding to the read post shifting phase $\Psi+\Psi^*$. The post shifting phase $\Psi+\Psi^*$ is supposed to be read all the time in this embodiment, but the post shifting phase $\Psi+\Psi^*$ may be read each time the phase command $\Psi^*$ is changed. The selected pulse waveform group for the three phases is output from the three-phase pulse pattern output section 200 to a three-phase switching command output section 220 as a pulse pattern phase-shifted from the basic phase $\Psi$ only by the phase command $\Psi^*$ calculated on the basis of the feedback calculation.

As described above, in this embodiment, the phase command calculating section 130, which calculates the phase command $\Psi^*$, which is an advanced angle amount/delayed angle amount to be corrected, through the torque feedback calculation, and the three-phase pulse pattern output section 200, which generates a fixed pulse pattern in accordance with the calculated phase command $\Psi^*$, are independent of each other. Thus, the phase command calculating section 130 repeatedly executes processing of successively storing and updating the acquired phase command $\Psi^*$ in the phase command memory 131 while executing the torque feedback calculation for calculating the torque deviation. On the other hand, the three-phase pulse pattern output section 200 repeatedly executes processing of generating a pulse pattern phase-shifted from the basic phase $\Psi$ only by the phase command $\Psi^*$ on the basis of the stored and updated phase command $\Psi^*$. Since the processing is executed independently from each other, the three-phase pulse pattern output section 200 can smoothly output the pulse pattern phase-shifted on the basis of the latest phase command $\Psi^*$ stored and updated in the phase command memory 131 each time. Moreover, the three-phase pulse pattern output section 200 generates the pulse pattern corresponding to the post shifting phase $\Psi+\Psi^*$ by selecting the pulse waveform group for the three phases stored in the waveform memory 210 and thus, can generate the pulse pattern for generating a switching command more easily and accurately. As a result, a calculation load in generating a pulse pattern on the basis of the feedback control by the microcomputer 100 is alleviated.

If the pulse pattern generated through the above-described processing is input into the three-phase switching command output section 220, the three-phase switching command output section 220 generates a switching command in accordance with the input pulse pattern in the three phases and outputs it to the inverter 230. The inverter 230 is a known inverter in which pairs of switching elements made of IGBT (Insulated Gate Bipolar Transistor) or the like, for example, are provided for three phases (6 elements). When the switching command output from the three-phase switching command output section 220 is input into the inverter 230 as above, the inverter 230 outputs a three-phase alternating rectangular wave voltage subjected to power conversion in accordance with the switching command and applies it to the three-phase AC motor M.

As described above, the three-phase AC motor M is driven on the basis of the three-phase alternating rectangular wave voltage and is subjected to the feedback control in accordance with the torque deviation.

Figure 7:
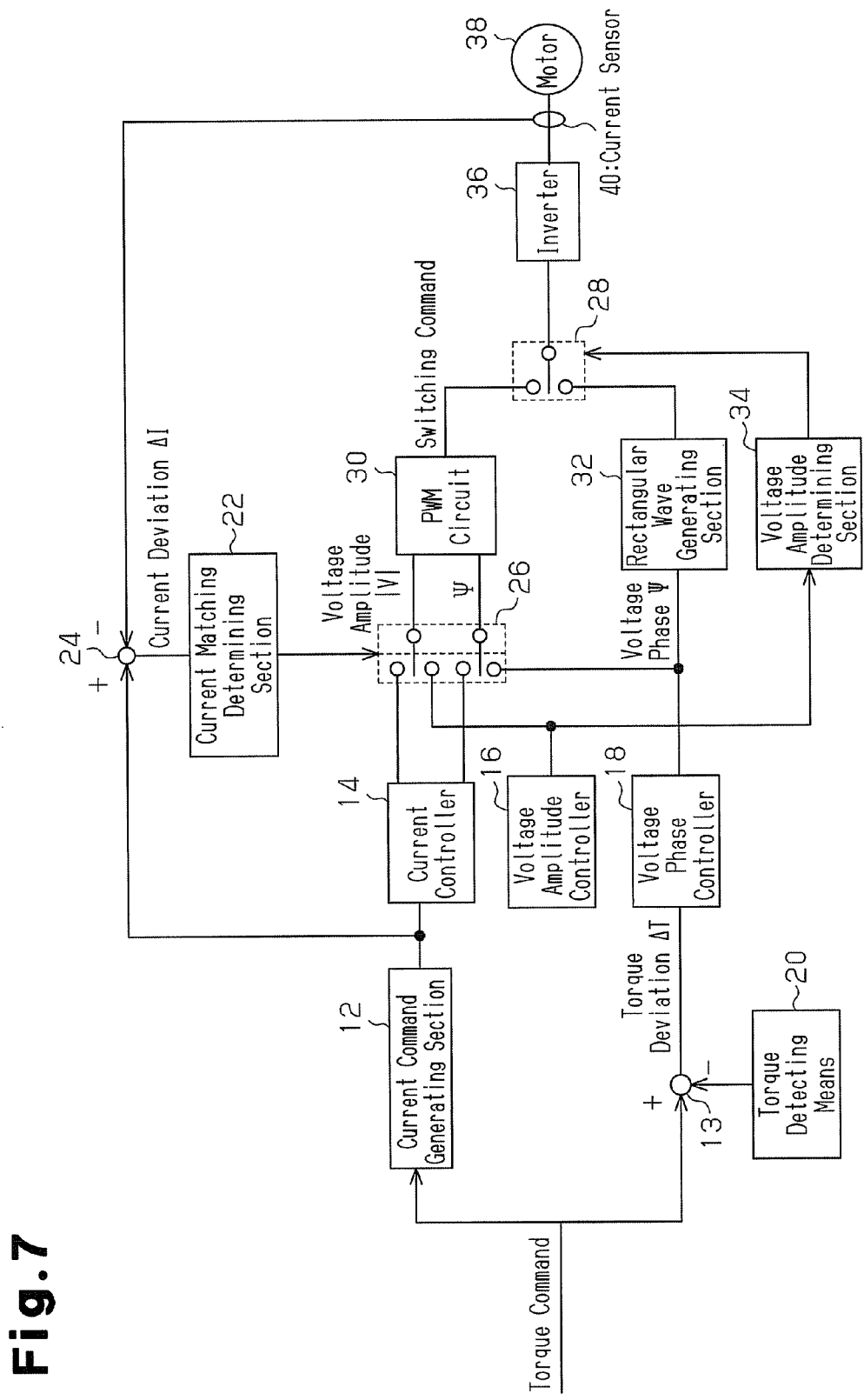
FIG. 7 is a block diagram illustrating a three-phase AC motor drive control device of a prior-art.
Figure 8:
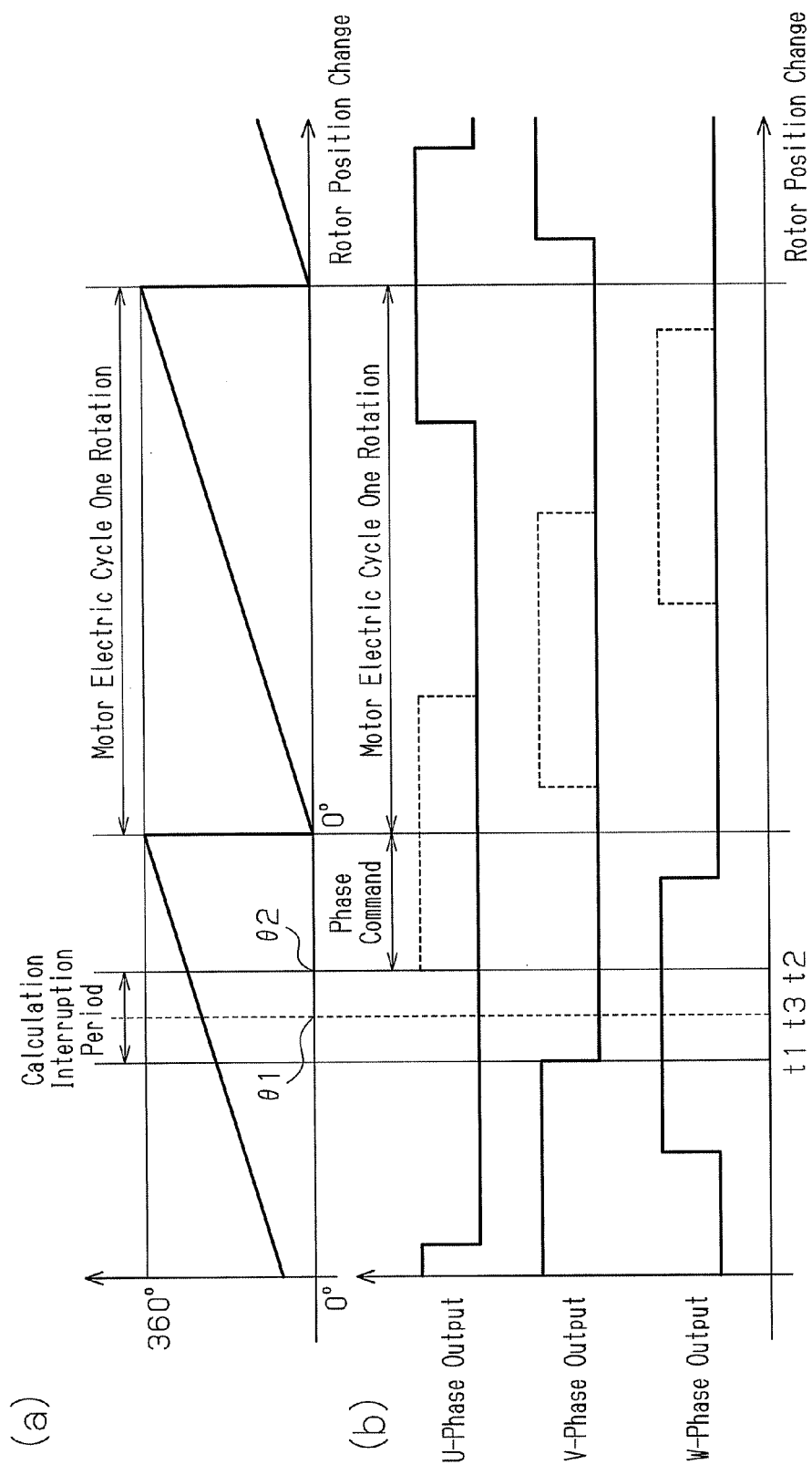
FIG. 8 is a timing chart illustrating an example of changes of (a) an electric angle corresponding to a rotor position of a three-phase AC motor, and (b) a three-phase rectangular wave voltage.

The three-phase AC motor drive control device according to this embodiment actually switches between the drive control (not shown) by three-phase AC subjected to power conversion on the basis of the pulse-width modulated switching command and the drive control by the three-phase alternating rectangular wave voltage subjected to power conversion on the basis of the pulse pattern set and output by the three-phase pulse pattern output section 200 similarly to the drive control device illustrated in FIG. 7. In the switching of the drive control, the drive control by the power-converted three-phase AC on the basis of the pulse-width modulated switching command is executed in a low rotation range of the three-phase AC motor M and the drive control by the three-phase alternating rectangular wave voltage is executed in a high rotation range of the three-phase AC motor M as described above.

Subsequently, the phase command calculation processing (torque feedback processing) executed by the phase command calculating section 130 will be described in detail by referring to FIG. 2. This processing is periodically executed with predetermined time intervals.

As illustrated in FIG. 2, first, in this processing, the command torque value generated in accordance with the accelerator pedal manipulation amount or the brake pedal depression amount in the vehicle control device and the actually detected torque value of the three-phase AC motor M driven in accordance with the command torque value are read (Steps S100 and S101). Subsequently, the phase command $\Psi^*$, which is the advanced angle amount/delayed angle amount of the phase to be corrected, is calculated through map calculation or the like, for example, in accordance with the torque deviation obtained by the torque feedback calculation on the basis of the read-in command torque value and detected torque value (Step S102). The value of the calculated phase command $\Psi^*$ is stored in the phase command memory 131 and updated (step 103). The above-described phase command calculation processing is repeatedly executed, by which the phase command $\Psi^*$ is successively calculated in accordance with the command torque value and detected torque value each time. Thus, the phase command $\Psi^*$ stored in the phase command memory 131 is successively updated by the calculated phase command $\Psi^*$.

Subsequently, the phase shift processing executed by the three-phase pulse pattern output section 200 will be described in detail by referring to FIGS. 3 and 4. FIG. 4 illustrates an example of changes of (a) the phase command $\Psi^*$ stored in the phase command memory 131 and updated; (b) the relationship between the post shifting phase $\Psi+\Psi^*$ successively updated in accordance with the phase command $\Psi^*$ and the switching angle of the three-phase alternating rectangular wave voltage; (c) the electric angle corresponding to the rotational position of the rotor of the three-phase AC motor M; and (d) the pulse pattern for the three phases in which the post shifting phase $\Psi+\Psi^*$ is reflected.

In this phase shift processing, (c) the electric angle of the three-phase AC motor M is successively acquired (Step S200) through monitoring of the rotational position of the rotor of the three-phase AC motor M. Moreover, (a) the phase command, that is, the phase command $\Psi^*$ stored in the phase command memory 131 and updated is added to the basic phase $\Psi$ in the adder 120, and the addition result $\Psi+\Psi^*$ is read (Step S201). Subsequently, (b) the phase advanced or delayed in angle with respect to the basic phase $\Psi$, that is, the post shifting phase $\Psi+\Psi^*$ is obtained (Step S202) on the basis of the read addition result $\Psi+\Psi^*$. The post shifting phase $\Psi+\Psi^*$ is calculated in such a mode that the voltage phase is advanced when the torque is not sufficient and the voltage phase is delayed when the torque is excessive in generation of a positive torque. Moreover, the post shifting phase $\Psi+\Psi^*$ is calculated in such a mode that the voltage phase is delayed when the torque is not sufficient and the voltage phase is advanced when the torque is excessive in generation of a negative torque. Thus, the torque of the three-phase AC motor M is increased/decreased only by the amount by which the voltage phase is advanced/delayed in angle with respect to the basic phase $\Psi$, and the torque deviation calculated through the torque feedback calculation, that is, deviation between the command torque value and the actual torque value is cancelled. If the post shifting phase $\Psi+\Psi^*$ is changed as illustrated in FIG. 3, the three-phase pulse pattern group corresponding to the shift after phase $\Psi+\Psi^*$ is selected from the waveform memory 210, and the selected pulse pattern group is output as a pulse pattern phase-shifted in accordance with the phase command $\Psi^*$(Step S203: YES, S204).

As a result, by referring to FIG. 4, first, the phase command $\Psi^*$ is successively updated to $\Psi^*$(n−1), $\Psi^*$(n), $\Psi^*$(n+1) . . . in accordance with the torque deviation as illustrated in (a). When the phase command $\Psi^*$ is successively updated as above, the post shifting phase $\Psi+\Psi^*$ is successively determined as $\Psi+\Psi^*$(n−1), $\Psi+\Psi^*$(n), $\Psi+\Psi^*$(n+1) in accordance with each of the phase commands $\Psi^*$(n−1), $\Psi^*$(n), $\Psi^*$(n+1) as illustrated in an arrow in (b). When the post shifting phase $\Psi+\Psi^*$ is successively determined as above, the pulse pattern for the three phases corresponding to the successively updated phases after shift $\Psi+\Psi^*$(n−1), $\Psi+\Psi^*$(n), $\Psi+\Psi^*$(n+1) is selected and output from the waveform memory 210 all the time as illustrated by broken-line arrows from (b) to (d). As a result, (d) the pulse pattern for the three phases in which the successively updated phase command $\Psi^*$ is reflected is generated. On the other hand, if the post shifting phase $\Psi+\Psi^*$ has not been changed, that is, if the torque deviation is constant, the three-phase pulse pattern group currently being output is continuously output (Step S203: NO).

As described above, if the command torque value is deviated from the actual torque value, the phase command $\Psi^*$ is calculated in order to cancel the deviation, the phase shift processing of a fixed pulse pattern is successively executed in accordance with the phase command $\Psi^*$, and the drive control of the three-phase AC motor M is executed in such a mode that the deviation between the command torque value to the three-phase AC motor M and the actually detected torque value of the motor M is cancelled.

If a period to a point in time at which the electric angle successively reaches an angle by which the combination of ON/OFF modes of the three-phase alternating rectangular wave voltage is changed (60° interval) becomes short due to a rise in the rotation number of the three-phase AC motor M, the calculation of the phase command $\Psi^*$ for the torque feedback processing might not be completed in the period. Even in such a case, according to the phase shift processing in this embodiment, the post shifting phase $\Psi+\Psi^*$ in accordance with the phase command $\Psi^*$ currently stored in the phase command memory 131 is continuously acquired (read). Thus, the three-phase pulse pattern according to such a post shifting phase $\Psi+\Psi^*$ is generated and output without interruption. As a result, generation of the three-phase pulse pattern and hence, generation of the alternating rectangular wave voltage to be applied to the three-phase AC motor M is made possible without being affected by the rise of the rotation number of the three-phase AC motor M or the like, and the drive control of the three-phase AC motor M can be executed with high reliability.

Subsequently, the relationship between the rotational position of the rotor of the three-phase AC motor M monitored through such drive control device and the pulse pattern for generating the three-phase alternating rectangular wave voltage generated in accordance with the rotational position will be described by referring to FIG. 5. FIG. 5 illustrates (a) the electric angle corresponding to the rotational position of the rotor of the three-phase AC motor M; and (b) the relationship between basic pulse patterns Lu0 to Lw0 corresponding to the basic phase $\Psi$ and the pulse patterns Lu1 to Lw1 corresponding to the post shifting phase $\Psi+\Psi^*$, respectively.

The basic pulse patterns Lu0 to Lw0 are set as follows for each cycle (0 to 360°) of the electric angle of the three-phase AC motor M as indicated by a broken line in (b). The basic pulse pattern Lu0 corresponding to the U-phase of the inverter 230 has an ON period during which the rotational position changes from 0° to 180°. The basic pulse pattern Lv0 corresponding to the V-phase of the inverter 230 has an ON period during which the rotational position changes from 120° to 300° in a mode of following with a delay of 120° from the basic pulse pattern Lu0. The basic pulse pattern Lw0 corresponding to the W-phase of the inverter 230 has an ON period during which the rotational position changes from 240° to 60° of the next electric angle cycle in a mode of following with a delay of 240° from the basic pulse pattern Lu0. As described above, each of the basic pulse patterns Lu0 to Lw0 (in other words, the basis phase Ψ) which becomes the references of the phase shift is uniquely determined in correspondence with one cycle of the electric angle of the three-phase AC motor M in this embodiment.

If the phase command Ψ* is acquired through the feedback calculation, the pulse patterns Lu1 to Lw1 phase-shifted from the basic pulse patterns Lu0 to Lw0 only by the phase command portion Ψ* are output as illustrated in (b). As described above, in this embodiment, the phase shift of each of the basic pulse patterns Lu0 to Lw0 determined in advance is successively executed on the basis of comparison with the electric angle of the monitored three-phase AC motor M all the time, and thus, the torque feedback is executed while the pulse patterns are not interrupted.

The above-described embodiment has the following advantages.

(1) The phase command calculating section 130, which executes the torque feedback calculation and successively stores and updates the phase command Ψ*, which is the advanced angle amount/delayed angle amount of the phase to be corrected, and the three-phase pulse pattern output section 200, which generates phase-shifted pulse pattern in accordance with the phase command Ψ*, are independent of each other. Thus, the phase command calculating section 130 repeatedly executes the processing of successively storing and updating the acquired phase command Ψ* in the phase command memory 131 while executing the torque feedback calculation for calculating the torque deviation. On the other hand, the three-phase pulse pattern output section 200 repeatedly executes the processing of generating the pulse pattern phase-shifted from the basic phase Ψ only by the phase command Ψ* on the basis of the stored and updated phase command Ψ*. As a result, regardless of whether or not the torque feedback calculation is completed, the pulse pattern for generating the switching command can be continuously generated, and thus, the drive control of the three-phase AC motor M can be executed with high reliability.

(2) The correction of the advanced angle amount/delayed angle amount of the phase on the basis of the torque feedback calculation is made as phase shift from the basic phase Ψ only by the phase command Ψ*. As a result, the correction of the advanced angle amount/delayed angle amount of the phase is realized accurately and easily, and thus, the calculation load of the microcomputer 100 is favorably alleviated.

(3) The angle by which the combination of the ON/OFF modes of the three-phase alternating rectangular wave voltage is changed is determined through calculation of the post shifting phase Ψ+Ψ* all the time and monitoring of the rotational position of the rotor of the three-phase AC motor M all the time. As a result, the phase command Ψ* acquired through the torque feedback calculation can be reliably reflected in the switching command. Moreover, since such phase shift processing is executed all the time, the phase shift is executed in accordance with the updated phase command at the time when the phase command Ψ* is updated on the basis of the torque feedback calculation. As a result, even if the torque deviation between the command torque value and the actual torque value is generated, the phase command Ψ* updated in accordance with the torque deviation and the post shifting phase Ψ+Ψ* are reflected in the pulse pattern with high responsiveness, and thus, the torque feedback control with higher accuracy is realized.

(4) Generation of the three-phase pulse patterns Lu1 to Lw1, which generate the switching command, is made by selection and output of the pulse waveform groups for three phases stored in the waveform memory 210. As a result, the generation of the three-phase pulse patterns Lu1 to Lw1 output in accordance with the phase command Ψ* is realized as the processing by hardware provided separately from the microcomputer 100, and thus, faster execution of the phase shift processing is realized through alleviation of the calculation load by the microcomputer 100.

(5) The microcomputer 100 is provided with the basic phase setting section 110, which sets the basic phase Ψ as a functional constituent element. Thus, flexibility in setting the basic phase Ψ by the basic phase setting section 110 is improved. As a result, even if the specification of the three-phase AC motor M subjected to the drive control is changed, the specification change is flexibly handled, and thus, versatility of the drive control device is further improved.

(6) The rotational position of the rotor of the three-phase AC motor M is detected by the rotor position detecting section 240 composed of a resolver and the like. As a result, detection of the rotational position and thus, monitoring of the rotational position by the three-phase pulse pattern output section 200 are facilitated.

The illustrated embodiment may be modified to the forms described below.

In the above-described embodiment, the basic phase setting section 110, the adder 120, and the phase command calculating section 130 as the functional constituent elements for calculating the post shifting phase Ψ+Ψ* are provided separately in the microcomputer 100. The configuration is not limited to that and as illustrated in FIG. 6, for example, as a drawing corresponding to FIG. 1, the microcomputer 100 may employ a phase command calculating section 150 provided with both a basic phase memory 151, which stores the basic phase Ψ as a fixed value, and a post shifting phase memory 152, in which an added value of the basic phase Ψ and the phase command Ψ* according to the torque deviation between the command torque value and the detected torque value is stored and updated. As a result, calculation algorithm of the calculation processing in the microcomputer 100 can be simplified since information required for the phase shift in the three-phase pulse pattern output section 200, that is, the post shifting phase by the phase command Ψ* with respect to the basic phase Ψ is acquired inside the phase command calculating section 150.

In the above-described embodiment, the ratio between the number of pairs of poles of the three-phase AC motor M and a multiplication factor for the angle of the resolver, which constitutes the rotor position detecting section 240, is 1:1. The ratio is not limited to that and the three-phase AC motor M and the resolver with a different ratio may be used and the three-phase pulse pattern can be corrected on the basis of the ratio. That is, if the number of pairs of poles of the three-phase AC motor M is 4 and the multiplication factor for the angle of the resolver is 2, a value of ½ times the electric angle of the actual three-phase AC motor M is detected by the resolver as the rotational position of the rotor. Thus, a detected value of the rotor position detecting section 240 may be corrected on the basis of the ratio between the number of pairs of poles of the three-phase AC motor M and the resolver and the three-phase pulse patterns Lu1 to Lw1 may be generated on the basis of the corrected value. According to such a configuration, versatility is further improved in the feedback control of the three-phase AC motor M by the drive control device.

In the above-described embodiment, the rotor position detecting section 240 is the resolver or the like. Instead of that, the rotor position detecting section 240 may be an encoder or other rotational position sensors as long as the rotational position of the rotor of the three-phase AC motor M can be monitored.

In the above-described embodiment, the three-phase pulse pattern output section 200 includes the memory control section 140 in the microcomputer 100 and the waveform memory 210 outside the microcomputer 100. Instead of this, the waveform memory 210 may be omitted, and generation of the three-phase pulse patterns Lu1 to Lw1 in accordance with the phase command Ψ* may be executed in the microcomputer 100. In this case too, since the phase command calculating section 130 and the three-phase pulse pattern output section 200 are independent of each other, the phase command calculating section 130 repeatedly executes the processing of successively storing and updating the acquired phase command Ψ* in the phase command memory 131 while executing the torque feedback calculation for calculating the torque deviation, while the three-phase pulse pattern output section 200 repeatedly executes the processing of generating the pulse pattern phase-shifted from the basic phase Ψ only by the phase command Ψ* on the basis of the stored and updated phase command Ψ*. As a result, even if the torque feedback calculation by the phase command calculating section 130 or the calculation of the phase command Ψ* is not completed in the period between angles during which the combination of the ON/OFF modes of the three-phase alternating rectangular wave voltage is changed and timing of the rotor position of the three-phase AC motor M is shifted, the three-phase pulse pattern output section 200 can reasonably output the phase-shifted pulse pattern on the basis of the phase command Ψ* currently stored in the phase command memory 131.

In the above-described embodiment, the drive control device of the three-phase AC motor switches between and executes the drive control by the three-phase AC power-converted on the basis of the pulse-width modulated switching command and the drive control by the three-phase alternating rectangular wave voltage power-converted on the basis of the pulse pattern set and output by the three-phase pulse pattern output section 200, though not shown. The configuration is not limited to that, and it is needless to say that the present invention may also be applied to a drive control device that executes only the drive control by the three-phase alternating rectangular wave voltage.

The invention claimed is:

1. A three-phase AC motor drive control device, wherein, when driving a three-phase AC motor by a three-phase alternating rectangular wave voltage that has been power-converted on the basis of a switching command set in accordance with one cycle of an electric angle acquired from a rotational position of a rotor of the three-phase AC motor, the control device feedback-controls the voltage phase of the three-phase alternating rectangular wave voltage on the basis of a torque deviation between a command torque value to the three-phase AC motor and an actual torque value of the three-phase AC motor, the control device comprising:

a phase command calculating section, which executes torque feedback calculation on the basis of the torque deviation, acquires a phase command, which is an advanced angle amount/delayed angle amount of a phase to be corrected on the basis of the calculation result, and successively stores and updates the acquired phase command; and a pulse pattern output section, which, in order to generate the switching command, always outputs a pulse pattern that is obtained by phase-shifting, only by the amount corresponding to the phase command, a basic phase of the three-phase alternating rectangular wave voltage, the basic phase being uniquely determined for one cycle of the electric angle, while monitoring the rotational position, wherein the pulse pattern output section has a nonvolatile waveform memory in which pulse waveform groups, each of which corresponds to three phases and is derived from a pulse pattern corresponding to the basic phase, are stored in advance, the number of stored pulse waveform groups being in accordance with the resolution of the phase command and maximum advanced angle amount/delayed angle amount with respect to the basic phase; and the control device always selects and outputs, from the waveform memory all the time, the pulse waveform groups for three phases in which the monitored rotational position corresponds to the phase command.

2. The three-phase AC motor drive control device according to claim 1, further comprising:

a basic phase setting section, which sets the basic phase; and an adder, which adds the set basic phase and the stored and updated phase command together and outputs the addition result, wherein the pulse pattern output section reads the addition result as a post shifting phase, which is obtained by phase-shifting the basic phase only by the amount corresponding to the stored and updated phase command.

3. The three-phase AC motor drive control device according to claim 1, wherein the phase command calculating section holds the basic phase as a fixed value, and successively stores and updates the addition result of the basic phase and the phase command.

4. The three-phase AC motor drive control device according to claim 1, wherein the monitored rotational position is detected by a rotational position sensor provided in the three-phase AC motor.

5. The AC motor drive control device according to claim 4, wherein the detected rotational position is corrected on the basis of the ratio between a multiplication factor for the angle of the rotational position sensor and the number of pairs of poles the three-phase AC motor.

6. The three-phase AC motor drive control device according to claim 1, wherein the three-phase AC motor is a drive power source for a vehicle, drive control of the three-phase AC motor includes drive control by three-phase AC that has been power-converted on the basis of a pulse-width modulated switching command, and the drive control by three-phase AC and drive control by the three-phase alternating rectangular wave voltage are switched and executed.

* * * * *